(12) United States Patent
Pinno-Rath et al.

(10) Patent No.: US 10,330,698 B2
(45) Date of Patent: Jun. 25, 2019

(54) DEFINABLY SWITCHABLE MAGNETIC HOLDING DEVICE

(71) Applicant: Anton Paar GmbH, Graz (AT)

(72) Inventors: Norbert Pinno-Rath, Graz (AT); Daniel Koller, Graz (AT)

(73) Assignee: Anton Paar GmbH, Graz (AT)

( * ) Notice: Subject to any disclaimer, the term of this patent is extended or adjusted under 35 U.S.C. 154(b) by 0 days.

(21) Appl. No.: 15/785,791

(22) Filed: Oct. 17, 2017

(65) Prior Publication Data
US 2018/0106833 A1   Apr. 19, 2018

(30) Foreign Application Priority Data

Oct. 18, 2016  (AU) .................................. 50941/2016

(51) Int. Cl.
*G01Q 30/20* (2010.01)
*G01Q 60/24* (2010.01)

(52) U.S. Cl.
CPC ............. *G01Q 30/20* (2013.01); *G01Q 60/24* (2013.01)

(58) Field of Classification Search
USPC ........................................................ 850/18
See application file for complete search history.

(56) References Cited

U.S. PATENT DOCUMENTS

| 5,260,577 A | 11/1993 | Abraham et al. |
| 5,406,832 A | 4/1995 | Gamble et al. |
| 5,598,104 A | 1/1997 | Boyette, Jr. |
| 5,847,383 A * | 12/1998 | Tong .................. G01Q 10/02 250/234 |
| 8,302,456 B2 | 11/2012 | Proksch |
| 8,461,557 B2 * | 6/2013 | Comunale ............ H01J 37/20 250/309 |

FOREIGN PATENT DOCUMENTS

| EP | 0 373 742 A2 | 6/1990 |
| EP | 0 373 742 B1 | 12/1995 |
| JP | 2003-329562 A | 11/2003 |

OTHER PUBLICATIONS

Datasheet—Keysight 5600LS AFM Enhanced Sample Versatility: 2-Inch Multi-Sample Wafer Vacuum Chuck; Keysight Technologies, Aug. 3, 2014.

* cited by examiner

*Primary Examiner* — Phillip A Johnston
(74) *Attorney, Agent, or Firm* — Robert A. Blaha; Smith Tempel Blaha LLC

(57) ABSTRACT

A holding device for detachably holding a magnetic sample holder or a sample body, in particular for a scanning probe microscope, wherein the holding device includes an accommodation unit for accommodating the magnetic sample holder or the sample body, a magnetic field guiding unit which, in a holding mode, is adapted for guiding a magnetic field for applying a magnetic holding force at the accommodation unit for holding the magnetic sample holder or sample body which is accommodated at the accommodation unit, and a magnetic field switching unit which is adapted for switching between at least two relative arrangements between the magnetic field guiding unit and the magnetic field switching unit, in order to selectively adjust the holding mode or a release mode, wherein in the release mode the magnetic sample holder or sample body is released for being detached from the accommodation unit.

20 Claims, 4 Drawing Sheets

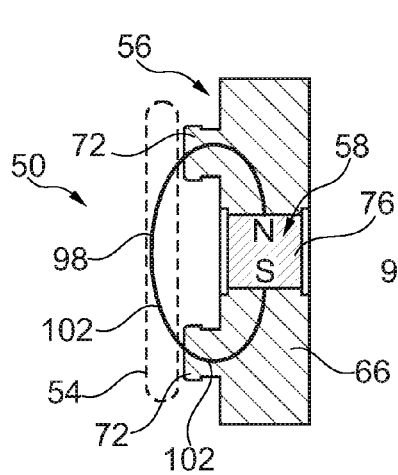
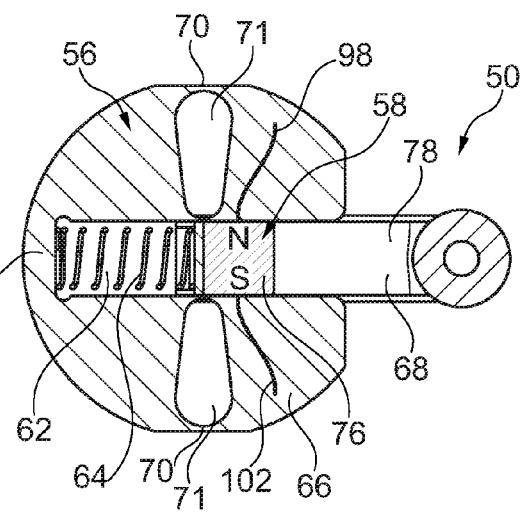
Fig. 3     Fig. 4
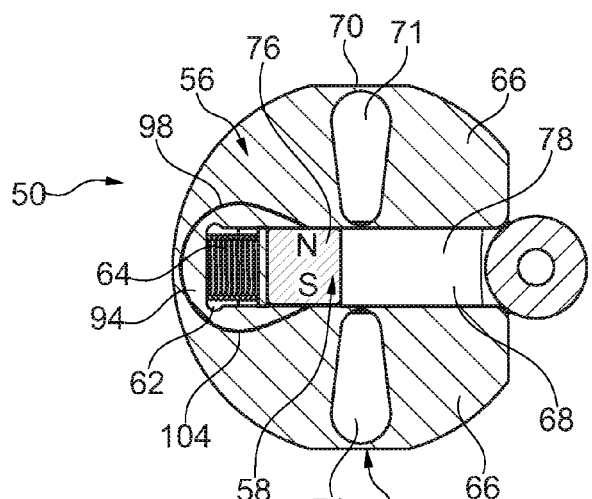
Fig. 5
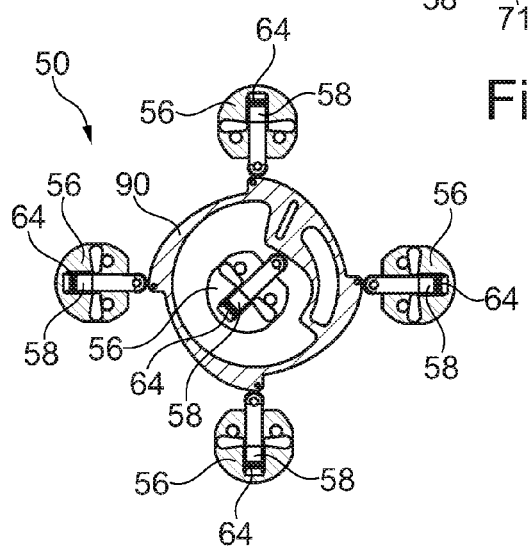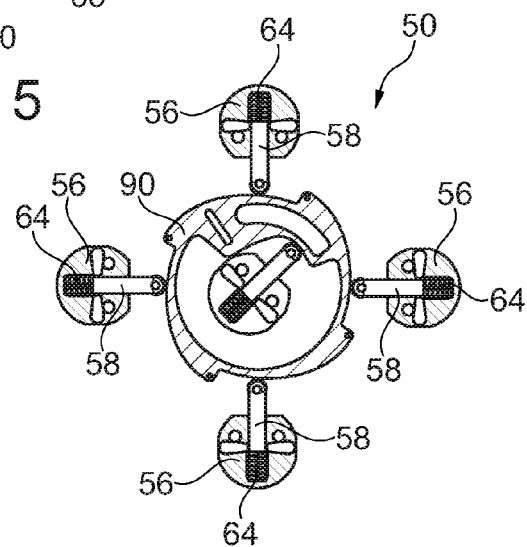
Fig. 6     Fig. 7

DEFINABLY SWITCHABLE MAGNETIC HOLDING DEVICE

CROSS-REFERENCE TO RELATED APPLICATIONS

This application claims the benefit of the filing date of Austrian Patent Application A50941/2016, filed 18 Oct. 2016, the disclosure of which is hereby incorporated herein by reference in its entirety.

TECHNICAL FIELD

Embodiments of the invention relate to a holding device, a scanning probe microscope and a method for detachably holding a magnetic sample holder or sample body of a scanning probe microscope.

TECHNOLOGICAL BACKGROUND

An atomic force microscope (Rasterkraftmikroskop, AFM) mainly serves for the lateral, respectively vertical high-resolution examination of surfaces (in particular topographical examinations of surfaces). A measuring probe (for example a bending beam which is also referred to as cantilever) with a nanoscopically small needle (also referred to as measuring tip or measuring probe tip) is guided over the surface (i.e. screened or scanned) and the deflection of the cantilever is detected based on the interaction of the cantilever with the surface. Depending on the surface property of the sample, the deflection of the cantilever in dependence from the position or the tracking of the probe is recorded. The deflection of the cantilever or the tip can be measured in a capacitive manner (in particular piezoelectrically) or by means of optical sensors. This method enables a structural examination of the surface of the sample up to an atomic resolution. The distance of the cantilever to the surface of the sample to be examined can be adjusted very precisely. Different measuring methods, such as a contact mode, a non-contact mode, a tapping mode (Tast-AFM Modus) etc. can be realized. In U.S. Pat. No. 5,406,832 A, the structure of an AFM is described.

A sample body which shall be measured by a scanning probe microscope is placed on a sample holder for the purpose of sample preparation. Then, this sample holder together with the sample body is fixed in the measuring device. Before starting the measurement, a sample body or a sample holder is to be attached to an accommodation unit of a holding device. Conventionally, such a procedure is elaborate.

U.S. Pat. No. 8,302,456 B2 discloses a sample holder and/or a sensor holder for an AFM which enable the measurement of especially small structures. An example for a vacuum-suction is utilized in the apparatus 5600 LS AFM which is sold by Keysight. According to JP 2003-329562 A, a sample holder contains a fix portion and a permanent magnet which can be guided in and out and which is fixed by means of a spring and a kind of bayonet lock. U.S. Pat. No. 5,260,577 discloses a sample carrier which is fixed by means of multiple magnets at a plate above it. EP 0,373,742 B1 discloses a sample on a sample-platform which in turn is lying on an auxiliary-platform. In both platforms magnets are located which are rotatable 90° around their own axis.

Another conventional variant of a fixation is the combination of a ferromagnetic sample holder and one or more permanent magnets in the measuring device. A disadvantage of this solution is that the user is obliged to pull the sample holder out of the measuring device against the acting magnet force under application of considerable muscle force. This leads to the risk of damage in the vicinity of the sensitive components of a scanning probe microscope and sensitive and small sample bodies, and is not user-friendly.

SUMMARY

There may be a need to provide a possibility of performing a mounting of the sample body at a scanning probe microscope in a quick, simple, error-robust and precise manner.

This need is met by the subject-matters with the features according to the independent claims. Further embodiments are shown in the dependent claims.

According to an embodiment of the present invention, a holding device for detachably holding a magnetic sample holder (which may also be referred to as sample carrier) is provided (in particular for a scanning probe microscope or for another measuring device), i.e. a sample holder which comprises or consists of a magnetic material (in particular ferromagnetic material, ferrimagnetic material, paramagnetic material and/or permanent magnetic material), or a magnetic sample body, i.e. a sample body which comprises or consists of a magnetic material (in particular ferromagnetic material, ferrimagnetic material, paramagnetic material and/or permanent magnetic material) (in this case, the sample body can also be mounted without a sample holder), wherein the holding device comprises an accommodation unit (for example a recess or an insert of a mounting plate) for accommodating the magnetic sample holder or the magnetic sample body, a magnetic field guiding unit which, in a holding mode, is adapted for guiding a magnetic field for applying a magnetic holding force at the accommodation unit for holding the magnetic sample holder or sample body which is accommodated at the accommodation unit, and a magnetic field switching unit which is adapted for switching between at least two relative arrangements between the magnetic field guiding unit and the magnetic field switching unit, in order to selectively adjust the holding mode or a release mode, wherein in the release mode, the magnetic sample holder or sample body is released for being detached from the accommodation unit. For example, the accommodation unit may also be formed by the surface of the holding device which is facing the sample holder or sample body.

According to further embodiment the present invention, a scanning probe microscope for determining surface information with respect to a sample body by means of scanningly sensing a surface of a sample body is provided, wherein the scanning probe microscope comprises a magnetic sample holder for holding the sample body, or the magnetic sample body without a sample holder, and a holding device with the above described features for detachably holding the magnetic sample holder or the sample body.

According to further exemplary embodiment, a method for detachably holding a magnetic sample holder or a magnetic sample body (in particular of a scanning probe microscope) is provided, wherein in the method the magnetic sample holder or sample body is accommodated at an accommodation unit, in a holding mode, a magnetic field for applying a magnetic holding force (in particular an attractive magnetic holding force) at the accommodation unit for holding the magnetic sample holder or sample body which is accommodated at the accommodation unit, is guided by means of a magnetic field guiding unit, and it is switched from one to another of at least two relative arrangements between the magnetic field guiding unit and a magnetic field switching unit in order to, starting from the holding mode, adjust a release mode in which the magnetic sample holder or sample body is released for being detached from the accommodation unit (in particular by a complete or at least as far as possible elimination of the magnetic force at the location of the accommodation unit, or by switching the magnetic force which is attractive in the holding mode into a repulsive magnetic force in the release mode).

OVERVIEW

In the context of the present application, the term "magnetic field guiding unit" denotes an at least partially magnetic structure which (in particular due to its shape and/or material composition) is capable for spatially guiding a magnetic field which is provided (for example by a magnetic field switching unit) in a pre-givable manner, i.e. to influence in a defined manner a path, an extension direction or a trajectory of magnetic fields lines of this magnetic field. The magnetic field guiding unit may be configured for guiding the magnetic field lines through the accommodation unit in the holding mode and for guiding away the magnetic field lines from the accommodation unit in the release mode.

In the context of the present application, the term "magnetic field switching unit" denotes an at least partially magnetic structure which (in particular due to its shape and/or material composition) is capable of generating a magnetic field which is spatially guided by the magnetic field guiding unit and, in (at least two) different switching states which in particular are assigned to different positions of the entire magnetic field switching unit or a part of the magnetic field switching unit, of adjusting different guiding paths of the magnetic field lines.

In the context of the present application, the term "relative arrangement" in particular denotes a relative spatial arrangement between the magnetic field guiding unit (either as a whole or of its single components) on the one hand and the magnetic field switching unit (either as a whole or of its single components) on the other hand. In particular, a relative arrangement in this context may denote a relative position of the magnetic field guiding unit with respect to the magnetic field switching unit or a relative orientation of the magnetic field guiding unit with respect to the magnetic field switching unit. A change of a relative arrangement between the magnetic field guiding unit and the magnetic field switching unit for a selective adjustment of the holding mode or the release mode may however be also performed by moving a component of the magnetic field guiding unit or the magnetic field switching unit relative with respect to a corresponding rest of the magnetic field guiding unit or the magnetic field switching unit and relative with respect to the respectively other one of the magnetic field guiding unit or the magnetic field switching unit.

In the context of the present application, the term "switching" in particular denotes that a well-defined switching state is transitioned into another well-defined switching state. Thus, the term "switching" in this context does not denote a stepless transition, but a defined and discrete transition from an operation mode to another operation mode.

In the context of the present application, the term "scanning probe microscope" (Rastersondenmikroskop) in particular denotes a microscope in which an image or other surface information of a sample body is not generated by an optical or electron optical image (i.e. using lenses), but by the interaction of the measuring probe with the sample body. The sample surface to be examined is sensed by the measuring probe in a scanning process point by point. The measuring values which result for each single point can then be assembled to an image or can be evaluated in another way.

According to an exemplary embodiment of the invention, a holding device is provided which can be switched in a defined manner between at least two well-defined relative arrangements between the magnetic field switching unit and the magnetic field guiding unit. In a first relative arrangement which corresponds to a holding mode, a magnetic sample holder or sample body at the accommodation unit on the one hand and the combination of magnetic field guiding unit and magnetic field switching unit on the other hand form a magnetic holding mechanism which is firmly fixing the sample at the accommodation unit. In a second relative arrangement which corresponds to a release mode, such a magnetic force is to a large extend or completely deactivated or at least strongly reduced or even opposite with respect to its sign. This can be achieved by a redirection or by a pole change of the previously attractive magnetic field by an interaction of magnetic field guiding unit and magnetic field switching unit after a switching process. Therefore, according to an exemplary embodiment, a simply configured and simply actuatable holding mechanism is provided which is based for example on a permanent magnetic magnetic field generation and which causes a magnetic force which can be switched off or inverted in a sample related spatial region. The activation or switching off or inversion of the magnetic force at the position of the magnetic sample holder/sample body preferably is performed purely mechanically and in addition requires only a very low actuation force. Such an architecture is compact with respect to its build-up and is vibration-free and robust in operation. In addition, in an advantageous manner, there is no heat development by the operation of the holding device, which would be highly undesired at this position. In contrast to permanent magnets which cannot be switched off and which function only for small sample holders, exemplary embodiments of the invention enable an operation which is safe during assembly and disassembly, also when large sample holders or sample bodies are present. Regardless of the magnetic attractive forces which are necessary for holding, according to an exemplary embodiment of the invention, a detachment of the sample holder can be accomplished with low force effort after switching the magnetic force, such that the sample holder, in an associated switching state, can be detached from the accommodation unit with a reduced, eliminated or even oppositely directed holding force.

In the following, additional exemplary embodiments of the holding device, the scanning probe microscope and the method are described.

According to an embodiment of the invention, the magnetic field switching unit may comprise a magnet, in particular a permanent magnet, for generating the (in the holding state attractive and in the release state guided away, reduced or pole-reversed in a repulsive manner) magnetic field. Thus, the magnetic field switching unit may be simultaneously configured as magnetic field generation unit. The mentioned magnet may thus be the source of the mentioned magnetic field. An operation of an electromagnet which is complex and which generates undesired heat may be dispensable when a permanent magnet is provided. The magnetic field switching unit can be operated in this manner without electric energy supply. However, according to alternative embodiments, an electric energy supply source, in particular for the operation of an electromagnet, may also be provided.

According to an embodiment of the invention, the magnetic field guiding unit may comprise or consist of magnetizable material, in particular ferromagnetic material. This material can, for example when a magnetic field is present which is generated, for example, by the magnetic field switching unit, purposefully spatially influence this magnetic field and can guide or redirect the magnetic flux through defined paths.

According to an embodiment of the invention, in the release mode, the magnetic field may be guided away from the accommodation unit. In other words, when the magnetic field switching unit takes a release position, the magnetic field which is generated by the magnetic field switching unit may be spatially guided or redirected by the material of the magnetic field guiding unit, such that it does no longer exert a magnetic attractive force on the magnetic sample holder or sample body in the region of the accommodation unit, but develops magnetic effects in another spatial region.

According to an embodiment of the invention, the magnetic field switching unit may be adapted for switching between the two (or more than two) relative arrangements by means of longitudinally, in particular by means of linearly, moving at least a part of the magnetic field switching unit. A longitudinal or linear motion in particular denotes a motion which runs exactly or at least substantially or predominantly straight-lined and may also comprise (for example within certain tolerances) a slight non-straight-lined component. By such a switching between different operation modes by performing a simple longitudinal motion, a defined adjustment of defined switching positions is possible with low effort. Furthermore, a translational switching motion favors the adjustment of defined switching states. However, alternatively, a rotational switching motion is possible as well.

According to an embodiment of the invention, the magnetic field switching unit may be adapted for purely mechanically switching between the at least two relative arrangements. Such a pure mechanical transition may for example be performed by a user under application of muscle force, which user can actuate an actuation element or can use a lever. Thereby, a simple operation by actuating the holding device is enabled, such that undesired electrical heat is avoided which can lead to undesired artifacts in measuring devices. The actuation of the holding device may also be performed by a suitable tool or without a tool. In the context of the present application, the term "actuatable without a tool" in particular denotes that the user does not have to use a tool (for example a screwdriver) or another auxiliary means outside the holding device for actuating the holding device for attaching and detaching the magnetic sample holder or sample body. However, alternatively to a user defined switching, also an automatic actuation of the holding device is possible.

According to an embodiment of the invention, the magnetic field guiding unit and the magnetic field switching unit may be adapted for, in the release mode, switching off the magnetic holding force for holding the magnetic sample holder or sample body which is accommodated at the accommodation unit, at the accommodation unit. In this manner, the detachment of the sample holder with the sample body from the mounting base of the measuring device can be performed almost without a force and without overcoming a large magnetic force (only a small gravitational force has to be overcome). Thereby, an especially user-friendly and safe operation is enabled.

According to an embodiment of the invention, the magnetic field guiding unit and the magnetic field switching unit may be adapted, in the holding mode, for forming magnetic field lines passing through the sample holder or the sample body at the accommodation unit, and, in the release mode, for forming magnetic field lines passing through an alternative path. Thus, by a mere redirecting of the magnetic field, the transition between holding mode and release mode can be performed in a simple manner. This constitutes an especially energy-saving, simple and user-friendly form of selective attachment or detachment of the sample holder at and from the accommodation unit.

According to an embodiment of the invention, the magnetic field guiding unit and the magnetic field switching unit may be adapted, in the holding mode, for forming a magnetic circuit through the sample holder or sample body at the accommodation unit, and in the release mode, for forming an alternative magnetic circuit past the sample holder or sample body at the accommodation unit. The term magnetic circuit in this context denotes the formation of closed magnetic field lines in a corresponding spatial region. While in the holding mode the magnetic lines run with a high density in the region of the sample holder or sample body or are concentrated there, in order to generate a high magnetic holding force, in the release mode, the magnetic lines of high density may be guided away from the sample holder and may be guided through an alternative path. In the latter operation state, the magnetic sample holder or sample body virtually does not experience a magnetic attachment force anymore.

According to an embodiment of the invention, the magnetic field switching unit may be adapted as a source of a magnetic flux (in particular may be provided with a permanent magnet), whose magnetic flux is guidable between the at least two relative arrangements through at least two different magnetic paths which are definable by the magnetic field guiding unit. The source of the magnetic flux of the magnetic field switching unit may be realized by at least one permanent magnet of the magnetic field switching unit. The magnetic field guiding unit can then fulfill the task to direct this magnetic flux to the accommodation unit for generating a magnetic attachment force or to guide the magnetic flux away from the accommodation unit for releasing the magnetic sample holder or sample body.

According to an embodiment of the invention the magnetic field guiding unit and the magnetic field switching unit may be adapted such that during converting between the at least two relative arrangements, a sum of the magnetic resistances of the both magnetic paths is substantially constant. In this manner, converting the holding device between the holding mode and the release mode is possible with low force, since the magnetic flux in the entire magnetic field guiding unit does not change or does only slightly change. This increases the user-friendliness of the holding device.

According to an embodiment of the invention, at least one of the at least two relative arrangements (in particular relative positions) may be assigned to an associated stop position of the magnetic field switching unit at a boundary wall of a recess in the interior of the magnetic field guiding unit. When the magnetic field switching unit or a component thereof (for example a magnetic carriage) abuts against an end surface of the recess of the magnetic field switching unit (for example an end surface of the recess of a magnetic shoe of the magnetic field switching unit), this constitutes an intuitive haptic feedback for a user, that a desired switching state (in particular the release mode) is adjusted. Furthermore, by the mechanical stop, it is ensured that a stable switching state is actually realized.

However, alternatively or additionally also the holding mode may be defined by a stop at an end surface. Instead, it is also possible to define one of the modes (in particular the holding mode) by the fact that a bias unit (for example a spring) is biasing the magnetic field switching unit or a part thereof (for example a magnetic carriage) in one of the modes (for example in the holding mode) in absence of an external force. Thus, according to an embodiment of the invention the holding device may comprise a bias unit (for example a spring, a rubber block or two bodies which are electrically equally charged and electrically insulated from each other) which is configured for mechanically biasing the magnetic field switching unit in one of the both relative arrangements, especially advantageously in the holding mode. By providing such a bias unit, it can be ensured that in absence of an external force, the system remains in one of the well-defined switching states. Preferably, in absence of an external force and as a result of the effect of the bias unit, the holding device is biased in the holding mode in order to avoid an undesired detachment of the sample holder. An unintentional release of the sample holder or sample body (for example by an unspecific shock or vibration in the environment of the holding device) can therefore be made impossible. In other words, for releasing, a user has to perform an active action to be capable to detach the magnetic sample holder or sample body from the accommodation unit.

According to an embodiment of the invention the magnetic field guiding unit may comprise an (in particular disk shaped) magnetic shoe with a recess and the magnetic field switching unit may comprise a magnetic carriage which is mounted within the recess for being displaced. The reciprocating displacement (Verfahren) of the magnetic carriage within the recess may correspond to the switching between the holding mode and the release mode, since a magnetic body of the magnetic carriage can accomplish a transfer of magnetic field lines of a high density between the region of the accommodation unit and a different region.

According to an embodiment of the invention, the magnetic shoe may comprise a magnetic barrier substantially perpendicular with respect to a displacement direction or sliding direction of the magnetic carriage, which magnetic barrier is defined by a nonmagnetic or not magnetic material (in particular one or more air gaps, preferably a pair of air gaps in the magnetic shoe). Such a magnetic barrier, for example a locally thinned portion of the magnetic shoe, can energetically make impossible that a magnetic path is running therethrough, and can promote another path along which magnetic fields lines of high density can be shifted between the holding mode and the release mode.

According to an embodiment of the invention a permanent magnetic block of the magnetic carriage may have a contact surface with a first interface surface of an adjacent wall of the recess on one side of the magnetic barrier in the release mode and/or with a second interface surface of an adjacent wall of the recess on another side of the magnetic barrier in the holding mode. This contact surface as corresponding subsurface of the permanent magnetic block may be smaller than the first interface surface and/or smaller than the second interface surface, may be in particular at most 90%, preferably at most 80%, and further preferably at most 70%, of the first interface surface, and/or may be at most 90%, preferably at most 80%, further preferably at most 70%, of the second interface surface (see FIG. 15). By providing an interface surface(s) which is significantly larger than the contact surface, a holding device can be provided which is very tolerant with respect to positional inaccuracies of the permanent magnetic body, without leaving its respectively defined switching state (in particular the holding mode or the release mode) in the case of such position fluctuations or inaccuracies.

Thus, independent from the position of the respective interface surface at which the contact surface is positioned, one and the same switching state can remain. Therefore, such a holding device is especially error-robust also under harsh conditions and when tolerances are present.

According to an embodiment of the invention, the magnetic shoe may comprise two pole projections made of magnetic material at a surface which is facing the accommodation unit. Also one or at least three pole projections are possible. For example, two substantially circular cylindrical or post-shaped pole projections may project with respect to an otherwise planar surface of the magnetic shoe and may thereby define regions through which the magnetic field lines of high density are definedly passing in one of the operation modes (in particular in the holding mode).

According to an embodiment of the invention, the magnetic carriage may comprise a permanent magnetic block which is (at one side or both sides) molded to a nonmagnetic material of the magnetic carriage. For example, the magnetic carriage may be a piston-shaped body which can be reciprocately displaced in a recess of the magnetic shoe. For example, a front region of the piston-shaped body can be made of the, in particular permanent magnetic, material, whereas a back region of the piston-shaped body can be made of a nonmagnetic material.

According to an embodiment of the invention the magnetic field guiding unit and the magnetic field switching unit may be adapted for switching between the at least two relative arrangements by changing a distance between the magnetic field guiding unit as a whole and the magnetic field switching unit as a whole. According to such an embodiment, by removing the magnetic field switching unit from the magnetic field guiding unit, respectively from the accommodation unit, the magnetic field strength in the region of the accommodation unit can be attenuated, whereby the release mode can be activated. Vice versa, by approaching the magnetic field switching unit to the accommodation unit, the holding mode can be activated.

According to an embodiment of the invention the magnetic field switching unit (or the magnetic field guiding unit) may be adapted for switching between the at least two relative arrangements by separating a partial magnetic portion from a remaining magnetic portion of the magnetic field switching unit (or the magnetic field guiding unit). By separating a magnetic component from one of the magnetic field switching unit or the magnetic field guiding unit, the magnetic field lines can be redirected such that, as a result of the separation, a transition between the holding mode and the release mode is caused.

According to an embodiment of the invention the magnetic field switching unit (or the magnetic field guiding unit) may be adapted for switching between the at least two relative arrangements by adding (Anfügen) an additional magnetic portion to a basic magnetic portion of the magnetic field switching unit (or the magnetic field guiding unit). Also by joining (Anstücken) a magnetic component of the magnetic field switching unit or the magnetic field guiding unit, the magnetic field lines can be redirected, such that, as a result of the joining, a transition between the holding mode and the release mode is caused.

According to an embodiment of the invention the holding device can be configured as energetically autarkic holding device, in particular operable without electric energy supply (for example purely by muscle force). In this manner, both undesired vibrations (as they may be generated in operation of a vacuum system) and an undesired heating (as it may occur in operation of an electric energy supply unit) of the holding device and thus the sample body on the sample holder can be avoided. Thereby, the measurement at the sample body can be performed with high precision and free of artifacts.

According to an embodiment of the invention the holding device may comprise at least one further magnetic field guiding unit and at least one further magnetic field switching unit with the above described features, wherein the magnetic field guiding unit and the magnetic field switching unit and the at least one further magnetic field guiding unit and the at least one further magnetic field switching unit may be adapted for commonly acting on the same accommodation unit (see FIG. 6 and FIG. 7). In order to be able to apply a desired or required holding force, an arbitrary number of magnetic field guiding units and magnetic field switching units can be combined in a pairwise manner in a holding device. In particular, the pairs can be operated in series.

According to an embodiment of the invention the holding device may comprise a (in particular stiff) control body which is drivable for simultaneously acting upon the magnetic field switching unit and at least one further magnetic field switching unit. In this manner, selectively some or also all components of the holding device which are generating the holding force can be converted to a desired state by a common actuation, in particular to the holding mode or the release mode. Thus, it is possible to actuate all or only a part of the magnetic circuit by means of the control body.

According to an embodiment of the invention the control body can be configured as a control disk which is drivable in a rotating manner in order to thereby simultaneously act upon the magnetic field switching unit and at least one further magnetic field switching unit which, at least partially together with the magnetic field guiding unit and the at least one further magnetic field guiding unit, may be circumferentially arranged around the control disk (alternatively or additionally also an arrangement within the control disk is possible). By rotating the control disk, carrier structures (Mitnehmerstrukturen) at the outer (and/or at the inner) circumference of the control disk can act upon respective magnetic field switching units and thereby can convert all magnetic field switching units in a desired operation mode simultaneously. By the circumferential arrangement of the magnetic field switching units and the associated magnetic field guiding units around the control disk, a substantially homogenous attachment force can be exerted on the magnetic sample holder or sample body.

According to an alternative embodiment the control body may be configured as a control disk. According to such an alternative embodiment it is possible to actuate a linear arrangement of magnetic circuits with a control rod, for example. Such a control rod may simultaneously act upon multiple magnetic field switching units of multiple holding devices which are linearly arranged, for example.

According to an embodiment of the invention the scanning probe microscope may comprise a measuring probe which is adapted for scanningly sensing the surface of the sample body at the magnetic sample holder or directly at the accommodation unit. In this manner, the measuring tip or measuring probe can scan the surface of the sample body and can thereby deliver information about the surface property of the sample body.

According to an embodiment of the invention the scanning probe microscope can be configured as an atomic force microscope. The atomic force microscope (AFM), also denoted as scanning force microscope or atom force microscope is a special scanning probe microscope. It serves as tool in surface chemistry, respectively in surface characterization, and functions for mechanically sensing surfaces and for the measurement of atomic forces on the nanometer scale.

BRIEF DESCRIPTION OF THE DRAWINGS

In the following, exemplary embodiments of the present invention are described in detail with reference to the following figures.

FIG. 3 shows a vertical cross-sectional view of the holding device according to FIG. 2 in a switching state according to a holding mode.

FIG. 4 shows a horizontal cross-sectional view of the holding device according to FIG. 2 in a switching state according to a holding mode.

FIG. 5 shows the horizontal cross-sectional view of the holding device according to FIG. 4 in a switching state according to a release mode.

FIG. 6 shows a holding device with an arrangement of multiple magnetic field switching units and magnetic field guiding units according to FIG. 2 to FIG. 5 in combination with a control body for simultaneously actuating all magnetic field switching units in a switching state according to a release mode.

FIG. 7 shows the arrangement of FIG. 6 in another switching state according to a holding mode.

DETAILED DESCRIPTION OF EXEMPLARY EMBODIMENTS

Figure 1:
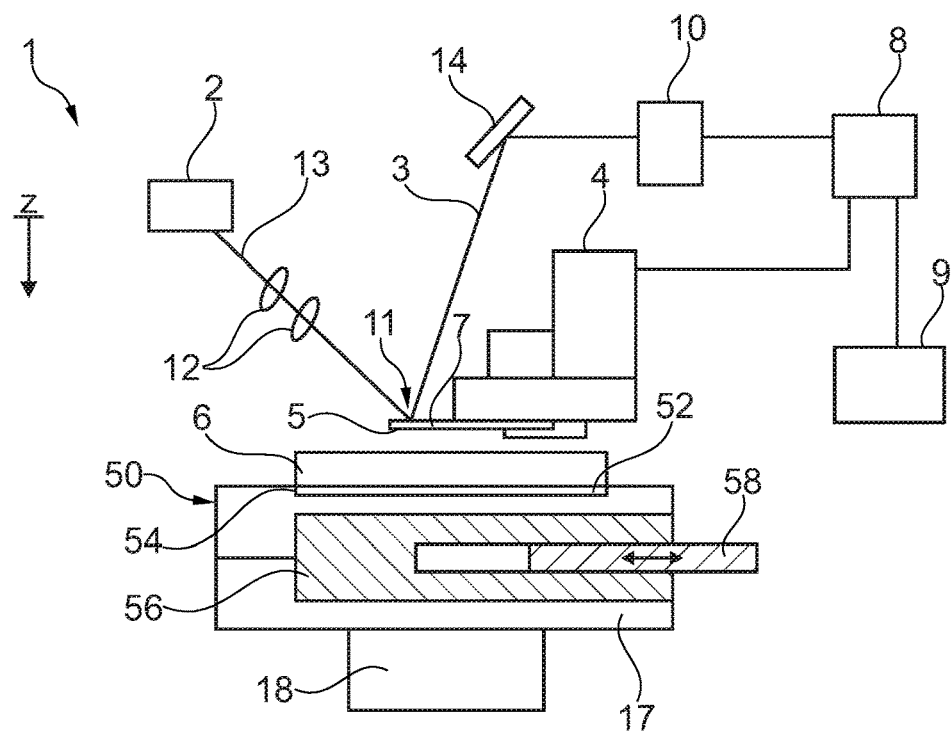
FIG. 1 shows a scanning probe microscope with a holding device according to an exemplary embodiment of the invention.

Same or similar components in different figures are provided with the same reference numbers.

Before, referring to the figures, exemplary embodiments of the invention are described, some general aspects of the invention and the underlying technologies shall be explained.

In order to fix a sample to be measured, which is also referred to as sample body, alone or with a sample holder on a sample-platform, in conventional scanning probe microscopes a fixedly mounted or a manually detachable permanent magnet is used, for example. The magnetic field of this permanent magnet cannot be switched off, such that either the magnet or the sample holder has to be moved against the magnetic field with a high force effort. In particular in the case of large sample holders, the magnetic attractive forces become so large that a simple withdrawing, respectively a lifting off, is only possible with a high force effort or is not possible anymore.

Alternatively, conventional electromagnets are used, whose attractive force can be switched on or off. Besides the high costs and the elaborate wiring, a further disadvantage of such a configuration consists in an undesired temperature rise by the holding current.

Furthermore, also vacuum suction mechanisms are used to fix a sample holder at a mounting base of a scanning probe microscope. However, these are elaborate and expensive, require additional hose conduits and in addition cause vibrations which in turn can distort the measurements in an especially undesired manner.

Starting from such conventional approaches, an embodiment of the invention provides a holding device which enables to fix a magnetic sample holder or a magnetic sample body on a platform in a secure and stable manner and without disturbing influence on a measurement, and wherein the sample holder or sample body can be removed in a simple and secure manner after performing the measurement.

According to an exemplary embodiment of the invention, at least one permanent magnet of a magnetic field switching unit which is located in a sample-platform can be reciprocated between at least two defined, distinctly distinguished switching positions. By a suitable arrangement of one or more ferromagnetic components between which a non-magnetic material (for example an air gap) is located, in a first position which may correspond to a holding mode, the magnetic field lines are running through the sample holder or sample body and are fixing it. In a second position which may correspond to a release mode, an alternative path for the magnetic field lines can be defined which is running through a material which is also ferromagnetic, such that in this mode no or only very low magnetic attractive forces act upon the sample holder or sample body. The magnetic sample holder or sample body can be easily removed in the release mode, whereas it is fixed with a strong magnetic force at an accommodation unit of the holding device in the holding mode.

According to an exemplary embodiment of the invention such a holding device can be applied to an arbitrary measuring unit where it is important to fix a sample holder or sample body during the measurement in a stable manner and to subsequently detach it in a simple manner. It is especially advantageous to utilize such a holding device for a scanning probe microscope, since the vibration-free, heating-free, as well stable and reliable operation fulfills the requirements of scanning probe microscopy especially good.

Thus, according to an exemplary embodiment of the invention a holding device for detachably fixing a sample body or a sample holder by a magnetic force effect is provided, wherein the following components may be utilized:

a basic plate or mounting plate at which an accommodation unit for accommodating a sample holder or sample body can be provided and which may be also denoted as sample platform; a magnetic field guiding unit and a magnetic field switching unit may be brought in operative connection with the accommodation unit and may participate in generating and spatially guiding a magnetic holding force;

a sample holder which may be configured as sample plate and at least one permanent magnet which may form the magnetic field switching unit or a part thereof, for example.

With such an arrangement, the fixing or detaching of the magnetic sample holder or sample body can be enabled by a relative motion between the permanent magnet and the accommodation unit, wherein an alternative circuit of the magnetic field can be established.

Although such a holding device can be utilized for different measuring devices, according to an exemplary embodiment of the invention it is especially advantageous to utilize such a holding device for a scanning probe microscope (SPM) or an atomic force microscope (AFM), since the special advantages of the holding device have an especially strong effect in such an application.

For example, the described motion of the magnet may be performed linearly or approximately linearly. This advantageously allows a motion between clearly separated switching positions which are separated from each other by a magnetic barrier.

A displacement against a spring force is not mandatory but highly advantageous. Generally, the magnet can also be reciprocated without a bias unit (for example by pushing or pulling). In particular in the embodiment which is illustrated in FIG. 6 and FIG. 7, wherein a feed (Vorschub) is performed by a rotated wedge (in particular a control body which is preferably configured as a control disk), a backward motion to the initial position can be accomplished in an especially comfortable, simple and precise manner by spring forces or other biasing forces. In an alternative embodiment it would be also possible to provide a counter wedge at the other side which would cause a backward motion, for example. Advantageously, a state "sample holder or sample body is fixed" (corresponding to the above described holding mode) can be given when the spring is relaxed. This means, for detaching the sample holder or sample body, it is actively worked against the spring force, i.e. the magnet is moved against the spring. Thereby it is ensured that the magnetic sample holder or a magnetic sample body is not undesirably detached from the holding device, since for this purpose, an active overcoming of the biasing force is required.

In an especially advantageous manner, according to an embodiment of the invention, multiple holding devices can be provided in a regular arrangement (see for example FIG. 6 and FIG. 7). This enables both an increase of the holding force and an especially regular or homogenous holding force.

FIG. 1 shows a scanning probe microscope (SPM) 1 according to an exemplary embodiment of the invention which is configured as atomic force microscope, AFM).

At the scanning probe microscope 1, a cantilever deflection, i.e. a positional change or a shape change of a measuring probe 11 (which is also referred to as cantilever) is detected by means of an optical sensor system. An electromagnetic radiation source 2 (for example a laser source) is sending an electromagnetic primary beam 13 (in particular a light beam) via a focusing unit 12 (which may be configured as arrangement of one or more optical lenses) on the measuring probe 11. The electromagnetic secondary beam 3 which is reflected by the measuring probe 11 is propagating to a photo sensitive and position sensitive detector 10 (in particular the electromagnetic secondary beam 3 can be redirected by means of a redirecting mirror 14 or another optical redirecting element on the position sensitive detector 10). When the measuring probe 11 is brought into motion via an actuator 4 (which can accomplish a positional change in the z-direction which, according to FIG. 1, is vertical) and/or when the measuring probe 11 changes its shape, a change of the laser light at the position sensitive detector 10 can be detected. Depending on an interaction of a measuring tip 5 (which is also referred to as cantilever tip) of the measuring probe 11 with a sample body 6 to be examined or to be characterized on a sample holder 52 at or in a holding device 50 according to an exemplary embodiment of the invention, the deflection of the measuring probe 11 will vary and an associated region at the detector 10 is struck by the electromagnetic secondary beam 3. The detector signal can then be processed in an evaluation unit 8. The generated high resolution image of the surface of the sample body 6 can then be illustrated by a display device 9. A surface of the sample body 6 can be scanned with the measuring tip 5 (i.e. a sensitive tip of the measuring probe 11). A sample table 17 is movable by actuators 18 in a plane which, according to FIG. 1, is horizontal (i.e. in an x-direction and a y-direction which are orthogonal with respect to the z-axis). Thus, the scanning probe microscope 1 serves for determining surface information with respect to the sample body 6 by means of scanningly sensing a surface of the sample body 6 by the measuring probe 11.

The already mentioned holding device 50 for detachably holding the magnetic sample holder 52 with the sample body 6 which is attached thereto is made of an accommodation unit 54, a magnetic field guiding unit 56 and a magnetic field switching unit 58. Exemplary embodiments of the holding device 50 are explained in more detail with reference to FIG. 2 to FIG. 15. Alternatively to providing a sample body 6 at the magnetic sample holder 52, it is also possible to attach a magnetic sample body 6 directly (i.e. without sample holder 52) at the accommodation unit 54. In this case, the magnetic holding force acts between the magnetic sample body 6 and the holding device 50.

Figure 2:
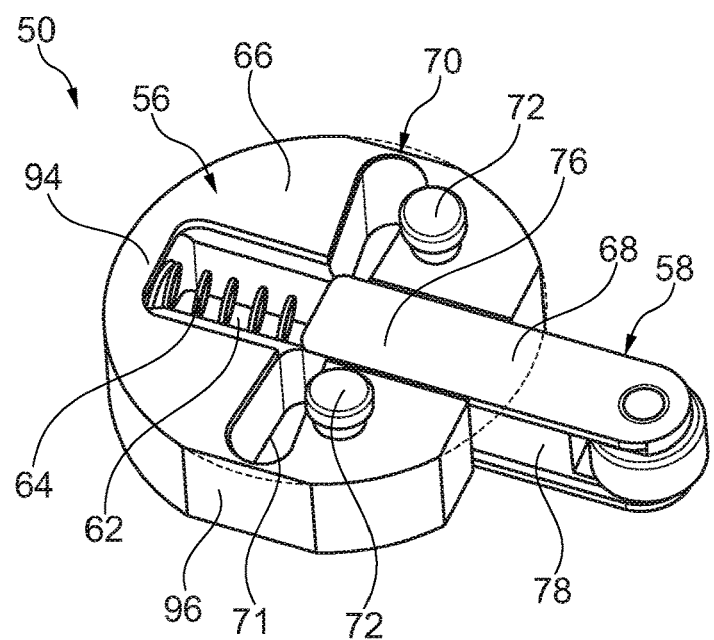
FIG. 2 shows a three-dimensional view of a holding device which is configured as magnetic lock according to an exemplary embodiment of the invention.

FIG. 2 shows a three-dimensional view of a holding device 50 which is configured as magnetic circuit, according to an exemplary embodiment of the invention. FIG. 3 shows a vertical cross-sectional view of the holding device 50 according to FIG. 2 in a switching state according to a holding mode. FIG. 4 shows a horizontal cross-sectional view of the holding device 50 according to FIG. 2 in a switching state according to a holding mode. FIG. 5 shows the horizontal cross-sectional view of the holding device 50 according to FIG. 4, but now in a switching state according to a release mode.

The holding device 50 according to FIG. 2 to FIG. 5 serves for detachably holding a sample holder 52 which is comprising a magnetic material, on which a sample can be measured can be arranged or which may constitute the sample to be measured (see FIG. 1, not illustrated in FIG. 2 to FIG. 5).

Especially advantageously, the holding device 50 can be implemented in a scanning probe microscope, such as that of FIG. 1.

The holding device 50 comprises an accommodation unit 54 which is also not illustrated in FIG. 2 (see FIG. 1), which is configured for accommodating the magnetic sample holder 52. The accommodation unit 54 is descriptively located above the components of the holding device 50, as it is illustrated in FIG. 2. The accommodation unit 54 may be a recess or an otherwise structurally defined or spatially delimited surface region of a sample table 17 or any other mounting platform for a sample holder 52, for example. In a simple case, the accommodation unit is formed by the surface of the holding device 50 which is facing the sample holder 52 or the sample body 6, for example. A user can mount a sample holder 52 with a sample body 6 which is arranged on it or at it and which is to be measured, at the accommodation unit 54.

A magnetic field guiding unit 56 which is configured stationary and non-movable with respect to the sample table 17 in the shown embodiment may be completely or partially made of a magnetic material (for example ferromagnetic material) and is positioned in an operative connection with the accommodation unit 54. The magnetic field guiding unit 56 in a holding mode serves for spatially guiding a magnetic field for applying a magnetic holding force at the accommodation unit 54. As a consequence, this holding force enables a magnetic holding of the magnetic sample holder 52 which is accommodated at the accommodation unit 54.

Furthermore, at the holding device 50, a magnetic field switching unit 58 is provided which is partially made of a permanent magnetic material (for example ferromagnetic material) in the shown embodiment and which is configured to be movable. The magnetic field switching unit 58 is adapted to switch between two relative positions between the magnetic field guiding unit 56 and the magnetic field switching unit 58, in order to selectively adjust the holding mode or a release mode. In the release mode, the magnetic sample holder 52 is released to be detached from the accommodation unit 54, since the magnetic field which, in the holding mode, is running through the sample holder 52 and is attracting the sample holder, is now spatially guided away from the sample holder 52 and does not exert any or does not exert a noteworthy magnetic attractive force on the sample holder 52 anymore. The magnetic field guiding unit 56 and the magnetic field switching unit 58 interact with each other, such that they are selectively switchable between the two relative positions. A first relative position which is shown in FIG. 2 to FIG. 4 corresponds to a holding mode in which the magnetic sample holder 52 is magnetically fixed to the accommodation unit 54 by a correspondingly generated magnetic force. This magnetic force is generated and spatially controlled by an interaction between the magnetic field guiding unit 56 and the magnetic field switching unit 58. On the contrary, a second relative position which is illustrated in FIG. 5 corresponds to a release mode of the holding device 50. In this release mode, in contrast to the holding mode, the magnetic sample holder 52 is released for being detached from the accommodation unit 54, since no attractive magnetic force acts on it anymore. This is accomplished by an interaction between the magnetic field guiding unit 56 and the magnetic field switching unit 58 in the second relative position in which a magnetic field which is generated by the magnetic field switching unit 58 is descriptively spatially redirected, to generate no noteworthy magnetic field in the region of the accommodation unit 54 anymore. Thereby, in the release mode, a user can remove the sample holder 52 from the holding device 50 without a large force effort.

As shown by a comparison between FIG. 4 and FIG. 5, the magnetic field guiding unit 56 and the magnetic field switching unit 58 are adapted for switching the holding device 50 by means of a linear horizontal longitudinal displacement of the magnetic field switching unit 58 between the two relative positions. In the state according to FIG. 4 which is adjusted without applying an external mechanical force, a bias unit 64 which is here configured as a spiral spring presses or forces the holding device 50 in the holding mode. The bias unit 64 may be realized as a (for example mechanical) return spring which is mounted for mechanically biasing the magnetic field switching unit 58 in the holding mode. Only when the biasing force which is applied to the magnetic field switching unit 58 by the bias unit 64 is overcome (wherein overcoming can be accomplished by applying muscle force or automatically) and by displacing the magnetic field switching unit 58 up to a front stop position within a recess 62 against the biasing force, the release position can be activated. In this manner, both the holding position (state of the holding device 50 without external force application) and the release position (displacing the magnetic switching unit 58 against the spring force up to the front stop) are assigned to well-defined spatial positions of the components of the holding device 50.

Advantageously, the magnetic field guiding unit 56 and the magnetic field switching unit 58 are adapted for switching or being switched purely mechanically between the two relative positions. Thus, for switching the holding device 50, no electrical driving energy and no vacuum force is required, such that neither an undesired heating during the measuring operation occurs, nor vibrations occur which extremely disturb the measuring operation. Thus, the holding device 50 can be configured energetically autarkic and thus compact. For converting the holding device 50 between the holding mode and the release mode, a pure displacing of the magnetic field switching unit 58 is sufficient.

In the embodiment according to FIG. 2 to FIG. 5, the magnetic field guiding unit 56 and the magnetic field switching unit 58 are adapted for, in the release mode, switching off the magnetic holding force for holding the magnetic sample holder 52 which is accommodated at the accommodation unit 54 at the accommodation unit 54. This can be recognized by means of magnetic field lines 98 which, in the holding mode according to FIG. 3, are running in the region of the schematically illustrated accommodation unit 54 and are concentrated there, whereas the magnetic field lines 98, in the release mode according to FIG. 5, are positioned at another location. In other words, in the holding mode, the magnetic field lines 98 are formed running through the sample holder 52 at the accommodation unit 54, whereas in the release mode, the magnetic field lines 98 are formed running through an alternative path and are curved away from the accommodation unit 54. Thus, the magnetic field guiding unit 56 and the magnetic field switching unit 58 in the holding mode form a magnetic circuit through the sample holder 52 at the accommodation unit 54 and, in the release mode, form an alternative magnetic circuit past the sample holder 52 at the accommodation unit 54. Therefore, the magnetic field switching unit 58 is adapted as a magnetic flux source whose magnetic flux, by switching between the two relative positions according to FIG. 2 to FIG. 4 on the one hand and according to FIG. 5 on the other hand, is guidable through two different magnetic paths which are defined by the shape of the magnetic field guiding unit 56.

Advantageously, the magnetic field guiding unit 56 and the magnetic field switching unit 58 are configured such that, during the conversion between the two relative positions, a sum of the magnetic resistances of the both magnetic paths is substantially constant. In this manner, the conversion between FIG. 4 and FIG. 5 can be realized with no force effort, since substantially only the biasing force of the bias unit 62 has to be overcome, but no noteworthy additional work for reconfiguring the distribution of the magnetic field lines 98 has to be performed.

It can also be taken from FIG. 2 to FIG. 5 that an associated stop position of the magnetic field switching unit 58 at a front surface of the recess 62 in an interior of the magnetic field guiding unit 56 is assigned to the release mode. This allows a precise control of the release mode, since a user gets a haptic feedback during converting the magnetic field switching unit 58 in the release mode when this conversion is completed.

In more detail, the magnetic field guiding unit 56 according to FIG. 2 to FIG. 5 is configured as disk-shaped ferromagnetic magnetic shoe 66 with a recess 62 which is formed as slit-shaped through hole. In a corresponding manner, the magnetic field switching unit 58 comprises a magnetic carriage 68 which is mounted within the recess 62 for being longitudinally displaced. The magnetic shoe 66 comprises substantially perpendicular with respect to a displacement direction of the magnetic carriage 68 a magnetic barrier 70 which is defined by a nonmagnetic material, which, in the illustrated embodiment, is configured as a pair of air gaps 71. More precisely, a barrier for a magnetic field through a respective thinned location 96 between the air gaps 71 and the edge of the magnetic shoe 66 is formed.

As can be best seen in FIG. 3, the magnetic shoe 66, on a planar surface which is facing the accommodation unit 54, comprises two pole projections 72 (which can also be referred to as poles) made of magnetic material. The magnetic barrier 70 and the pole projections 72 serve for controlling a course of the magnetic field lines 98, respectively of their migratory motion during the conversion of the holding device 50 between the holding mode and the release mode.

In the illustrated embodiment, the magnetic carriage 68 contains a permanent magnetic block 76 at which nonmagnetic material 78 of the magnetic carriage 68 is molded on both sides. The permanent magnetic block 76 and the nonmagnetic material 78 commonly form the piston-like magnetic carriage 68 which can be reciprocated by muscle force and by the biasing force of the bias unit 64 in the recess 62.

The assembly which is shown in FIG. 2 to FIG. 5 can be denoted as magnetic lock. It is made of the ferromagnetic magnetic shoe 66 which directs or guides the magnetic flux, the magnetic carriage 68 which contains the permanent magnetic block 76, and the bias unit 64 which is configured as return spring.

FIG. 3 and FIG. 4 show the magnetic lock as sectional view. The permanent magnetic block 76 generates, respectively causes, a magnetic field which is mainly guided via the both poles or pole projections 72 (main field) due to the geometry of the magnetic shoe 66. When now both pole projections 72 are brought in contact with a ferromagnetic sample holder 52 or sample body 66, a magnetic attractive force is generated here. A small part of the field is guided via the magnetic barrier 70 (or thinned location 96) and the secondary circuit 94 (which can be denoted as secondary field). This small and often negligible part is lost for the generation of the holding force.

When now the magnetic carriage 68 with the permanent magnetic block 76 is displaced against the restoring force of the bias unit 64 past the magnetic barrier 70 (respectively thinned location 96), the field distribution is inverted. This is illustrated in FIG. 5. Since now a path via the secondary lock 94 results for the secondary field, which path does not lead via the magnetic barrier 70 (respectively reference sign 96), this part of the field gets decisive. On the contrary, the main field becomes negligible. The magnetic attractive force between the sample holder 52 or sample body 6 and the magnetic lock disappears.

During the displacement of the magnetic carriage 68 inclusively the permanent magnetic block 76 between the both shown positions or relative arrangements according to FIG. 4 and FIG. 5, the sum of the magnetic resistances of the both paths for the main field and the secondary field remains approximately equal. Consequently, for displacing the permanent magnetic block 76, except of the spring force of the bias unit 64 which is configured as return spring, almost no actuation force is necessary.

With the embodiment described according to FIG. 2 to FIG. 5, a fixing of a sample holder 52 without disturbing influence on the AFM-measurement due to a undesired temperature change (as for example when a holding current-electromagnet is used) and/or undesired vibrations (as for example in the case of a vacuum fixing) is enabled.

As can further be taken from FIG. 2 to FIG. 5, a linear actuation of the magnetic lock is enabled by the shown configuration. This allows a simple handling and a simple construction. Furthermore, the magnetic lock in form of the holding device 50 can be operated autarkic, such that in particular no electric wiring or vacuum host conduit is necessary.

FIG. 6 shows a holding device 50 with an arrangement of multiple magnetic field switching units 58 and magnetic field guiding units 56 according to FIG. 2 to FIG. 5 in combination with a common control body 90 for simultaneously actuating all magnetic field switching units 58 in a switching state according to a release mode. FIG. 7 shows the arrangement of FIG. 6 in another switching state according to a holding mode.

As illustrated in FIG. 6 and FIG. 7, the shown holding device 50 comprises multiple magnetic field guiding units 56 according to FIG. 2 to FIG. 5 and multiple magnetic field switching units 58 according to FIG. 2 to FIG. 5 which are interacting with the magnetic field guiding units 56. The magnetic field guiding units 56 and the associated magnetic field switching units 58 are adapted to commonly act upon the same accommodation unit 54 and thus upon the same sample holder 52 or sample body 6 (both not illustrated in FIG. 6 and FIG. 7). For this purpose, the holding device 50 according to FIG. 6 and FIG. 7 comprises a control body 90 which is configured as control disk, which can be set in a rotational motion by a motor or by muscle force. When rotating around a certain angle, radially outer regions of the control body 90 at the same time or simultaneously act as carrier upon all magnetic field switching units 58 to bring them into the release mode (see FIG. 6). In order to bring all magnetic field switching units 58 into the holding mode (see FIG. 7), the rotation angle of the control body 90 is adjusted such that no force is applied against the bias unit 64 by the control body 90. Therefore, according to FIG. 6 and FIG. 7, the control body 90 is configured as a control disk, respectively as a control ring. This control body 90 is drivable in a rotating manner in order to thereby simultaneously act upon the magnetic field switching units 58 which are, in common with the magnetic field guiding units 56, partially circumferentially arranged around the control disk. A further pair of a magnetic field guiding unit 56 and an associated magnetic field switching unit 58 which functionally belong together is positioned in the center of the arrangement according to FIG. 6 and FIG. 7, i.e. in a central recess of the control ring. A projection at an inner radius of the control ring which is functioning as carrier is acting upon the last mentioned magnetic field switching unit 58. With a holding device 50 according to FIG. 6 and FIG. 7, a high holding force can be achieved with a space saving and simply controllable configuration.

In order to ensure an especially high attractive force and an especially regular force distribution over larger sample holders 52, multiple magnetic locks in co-operation can be utilized in the manner shown in FIG. 6 and FIG. 7, for example. The assemblies (of which each comprises a magnetic field guiding unit 56 and an associated magnetic field switching unit 58) are directed via a common control disk in form of the control body 90. When the control body 90 is rotated, this leads to a substantially simultaneous retracting and extending of the magnetic carriages 68 at all magnetic locks and thus to simultaneously switching on or off the attractive forces. Thus, according to the embodiment of FIG. 6 and FIG. 7, a discretely adjustable holding force is enabled by a parallel switching of N magnetic locks, wherein N may be any number larger than or equal to two.

Figure 8:
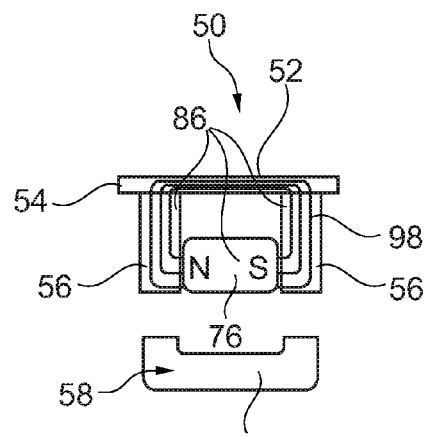
FIG. 8 shows a schematic side view of a holding device according to another exemplary embodiment in a switching state according to a holding mode.
Figure 9:
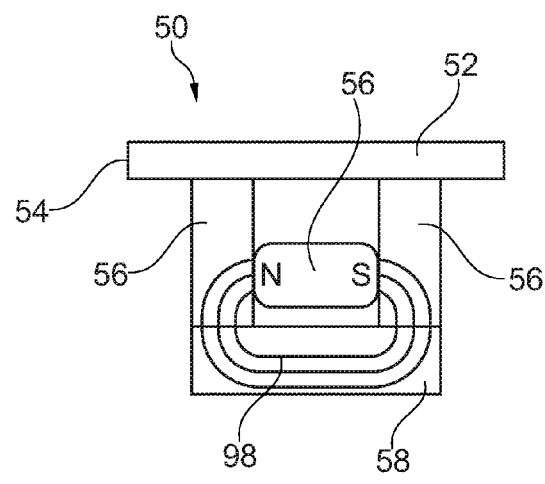
FIG. 9 shows the holding device according to FIG. 8 in another switching state according to a release mode which is adjusted by adding a component of the magnetic field switching unit.

FIG. 8 shows a schematic side view of a holding device 50 according to another exemplary embodiment in a switching state according to a holding mode. FIG. 9 shows the holding device 50 according to FIG. 8 in another switching state according to a release mode which is adjusted by adding, respectively spatially approaching, the magnetic field switching unit 58.

Thus, according to FIG. 8 and FIG. 9, the holding device 50 is adapted to switch between the two relative arrangements, in particular from the holding mode (see FIG. 8) to the release mode (see FIG. 9), by adding an additional magnet section 84 which here forms the magnetic field switching unit 58 to a basic magnet section 86 which here forms the magnetic field guiding unit 56. In order to convert the holding device 50 according to FIG. 8 and FIG. 9 between the two shown relative arrangements, the magnetic circuit is redirected corresponding to the magnetic fields lines 98 by moving the magnetic field switching unit 58. According to FIG. 8, the magnetic circuit of the magnetic field lines 98 is running through the magnetic sample holder 52 and thus magnetically attracts it. According to FIG. 9, the magnetic circuit of the magnetic field lines 98 is redirected by adding the magnetic field switching unit 58 to the magnetic field guiding unit 56 and is guided away from the sample holder 52, such that the magnetic holding force on the magnetic sample holder 52 is switched off. It should be noted that in the embodiment according to FIG. 8 and FIG. 9, the permanent magnetic block 76 forms a part of the magnetic field guiding unit 56 (and not of the magnetic field switching unit 58), such that the function of magnetic field generation according to the described embodiment is taken over by the magnetic field guiding unit 56.

Providing a secondary circuit with a distinctly lower magnetic resistance, as illustrated in FIG. 8 and FIG. 9, the magnetic flux through the sample holder 52 is also reduced.

Since in the embodiment according to FIG. 8 and FIG. 9 (in contrast to the embodiments according to FIG. 2 to FIG. 7, FIG. 10 to FIG. 15) an increase of the magnetic resistance of the entire system occurs which is not negligible, according to FIG. 8 and FIG. 9, a mechanical force has to be used which is in the order of magnitude of the holding force.

Figure 10:
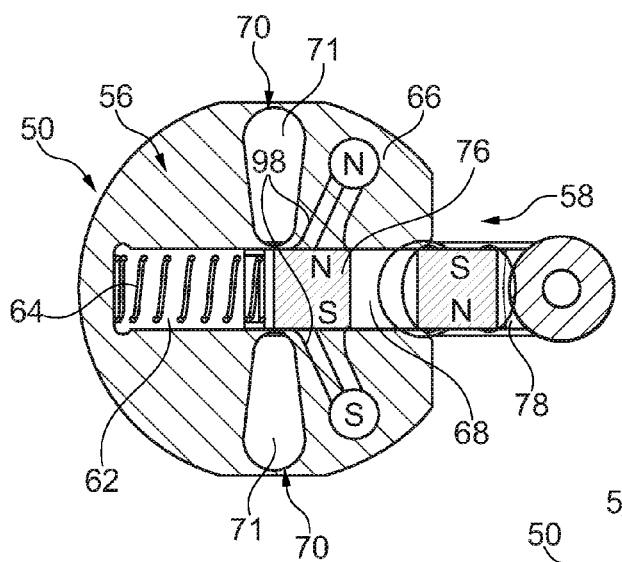
FIG. 10 shows a cross-sectional view of a holding device according to another exemplary embodiment with two permanent magnets of a magnetic field switching unit in a switching state according to a holding mode.
Figure 11:
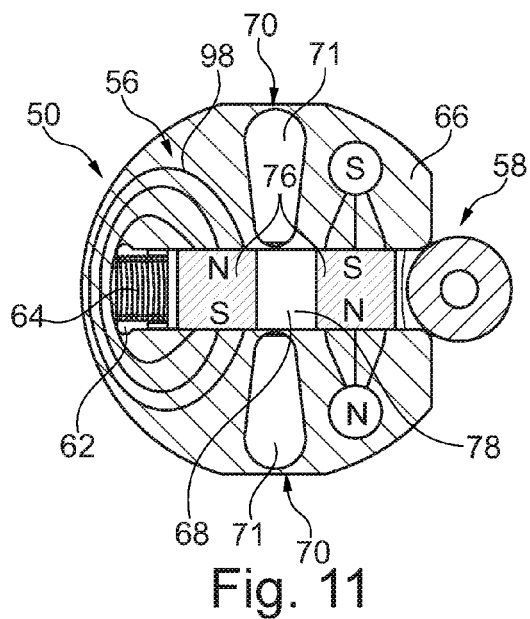
FIG. 11 shows a cross-sectional view of the holding device according to FIG. 10 in a switching state according to a release mode.

FIG. 10 shows a cross-sectional view of a holding device 50 according to an exemplary embodiment with two permanent magnetic blocks 76 of a magnetic field switching unit 58 in a switching state according to a holding mode. FIG. 11 shows a cross-sectional view of the holding device 50 according to FIG. 10 in a switching state according to a release mode.

As further alternative, compare FIG. 10 and FIG. 11, the magnetic lock can be configured and can be operated in a manner, wherein the magnetic field is not switched on or off, but the polarity of the originating magnetic field is reversed. When the magnetic carriage 68 corresponding to FIG. 10 and FIG. 11 is provided with a second, reversely polarized permanent magnet (i.e. with an additional permanent magnetic block 76), the polarization of the poles or pole projections 72 of the magnetic lock, respectively the holding device 50, can be inverted by displacing the magnetic carriage 68. In combination with the further permanent magnet at the sample holder 52 (compare for example the right side of FIG. 12) and can be switched from attraction to repulsion.

In general it should be clear that the holding device 50 according to all exemplary embodiments of the invention can be selectively operated between exactly two switching states (i.e. the holding mode and the release mode), or alternatively between at least two switching states. When exactly three switching states are provided, it can be switched between a holding mode with an attractive magnetic force, a release mode with a magnetic force which substantially or completely disappears at the accommodation unit, and a repulsion mode with a magnetic force which is acting repulsive at the accommodation unit, for example. When three or even more switching states are provided, a holding device may also handle multiple accommodation regions or multiple sample holders 52 or multiple sample bodies 6 (see for example FIG. 12 described in the following) and/or can take over further functions.

Figure 12:
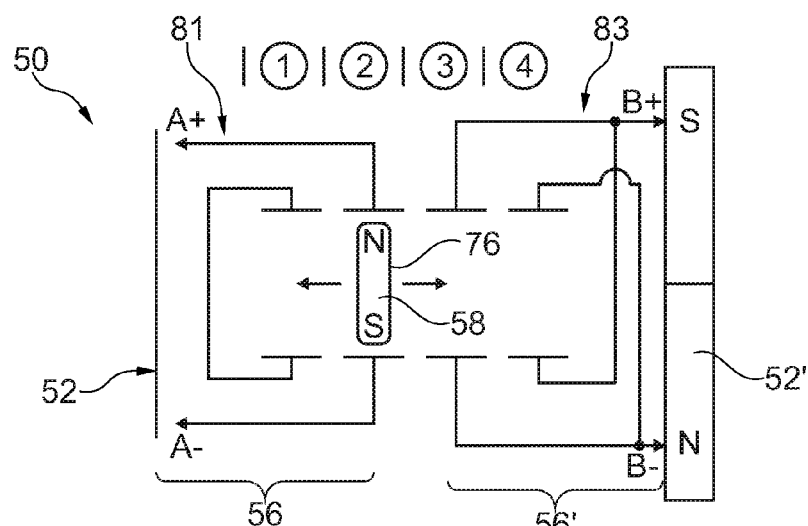
FIG. 12 shows a schematic diagram of a holding device according to another exemplary embodiment of the invention.

FIG. 12 shows a schematic view of a holding device 50 according to another exemplary embodiment of the invention.

The magnetic lock according to FIG. 12 is made of at least one permanent magnet as permanent magnetic block 76 and at least two, selectively usable magnetic circuits 81, 83. The permanent magnetic block 76 entirely or partially constitutes the magnetic field switching unit 58 and is longitudinally displaceable as illustrated with two arrows in FIG. 12. Each of the both magnetic circuits 81, 83 forms a corresponding magnetic field guiding unit 56, 56'. The magnetic field guiding unit 56 is guiding a magnetic field in the region of a first sample holder 52, whereas the magnetic field guiding unit 56' is guiding a magnetic field in the region of the second sample holder 52'. In the shown embodiment, the sample holder 52 is configured as magnetic sample holder (for example made of a magnetizable material) and the sample holder 52' is configured as permanent magnetic sample holder. Alternatively it is also possible to form both sample holders 52, 52' made of a magnetizable (but not magnetized yet, for example) material or to form both sample holders 52, 52' made of a permanent magnetic material. In FIG. 12, it is further schematically illustrated that the permanent magnetic block 76 of the magnetic field switching unit 58 can be located in four switching positions or four switching states, which are denoted with (1), (2), (3), (4). Each of these switching states (1), (2), (3), (4) is corresponding to a respective relative arrangement or relative position of the magnetic field switching unit 58 to a respective one of the magnetic field guiding units 56, 56'.

The permanent magnet in form of the permanent magnetic block 76 serves as a source of a magnetic flux in the holding device 50. For guiding this flux (compare magnetic field guiding units 56, 56') at least two different, constructively distinguishable magnetic paths are implemented. Each of these paths possesses two interface surfaces which are formed in a manner that the permanent magnetic block 76 can be reciprocated between the interface surfaces of the single circuits (also compare FIG. 15). When the permanent magnetic block 76 is positioned such that the poles of the permanent magnetic block 76 coincides with the interface surfaces of one of the magnetic circuits, the majority of the magnetic flux is guided through this circuit. This circuit (in the following referred to as active circuit) can fulfill its respective task (for example magnetically fix the sample holder 52, respectively the sample holder 52').

The circuits can be configured such that in the operation state the magnetic resistances of two adjacent circuits are similar. In this manner, little force effort is required for displacing the at least one permanent magnetic block 76.

Figure 15:
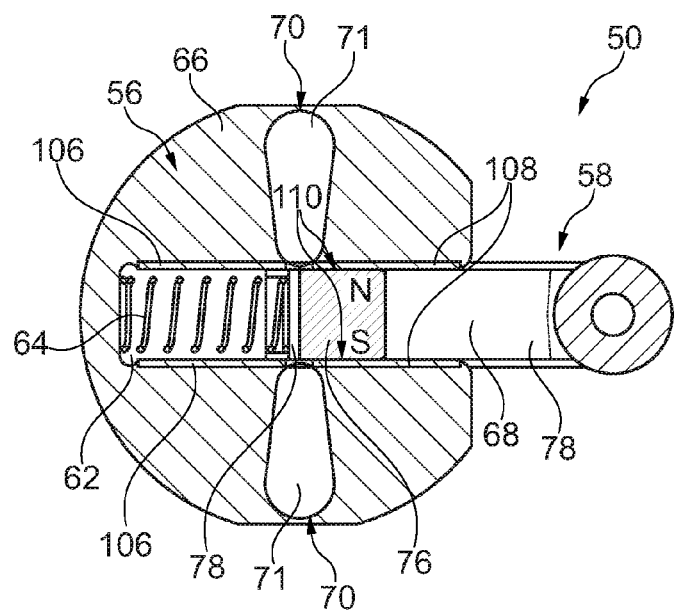
FIG. 15 illustrates, for the embodiment according to FIG. 2 to FIG. 5, a schematic diagram corresponding to FIG. 12.

Preferably, the interface surfaces are distinctly larger than corresponding surfaces of the at least one permanent magnetic block 76 (compare FIG. 15 and corresponding description). In this manner, distinctly distinguishable and well-defined switching positions or switching states (1), (2), (3), (4) are resulting.

For example, the switching state (1) may correspond to a secondary circuit of the magnetic field. Switching state (2) may correspond to a holding mode of the sample holder 52. Switching state (3) may correspond to a holding mode of the sample holder 52'. The switching state (4) may in turn correspond to a secondary circuit of the magnetic field.

Exemplary, the following functions in magnetic circuits are possible:

switching state (1): the magnetic circuit is made of a magnetic secondary circuit with a resistance which is as low as possible. In this manner, no noteworthy flux out of the mechanism occurs (magnet is switched off)

switching state (2): the poles A+ and A− are polarized. When they are connected to each other through a ferromagnetic sample holder 52, a magnetic flux and thus an attractive force occurs switching state (3): the poles B+ and B− are polarized. The force effect is transferred from the pole pair A to the pole pair B. When the poles B+ and B− are connected with the magnetic (in particular permanent magnetic) sample holder 52', a force effect occurs which is even stronger than in the case when the sample holder 52 is only ferromagnetic.

Switching state (4): the poles B+ and B− are reversely polarized. By the reversion of the polarization of the poles, now a repulsive effect between the mechanism and the sample holder 52' occurs.

Figure 13:
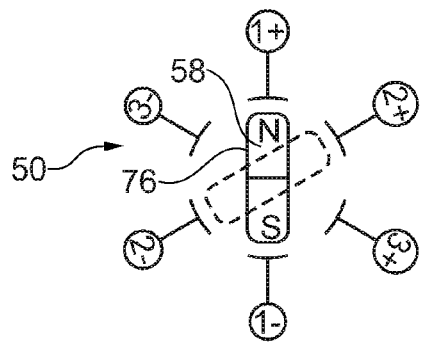
FIG. 13 shows a schematic diagram of a holding device according to a further exemplary embodiment of the invention.
Figure 14:
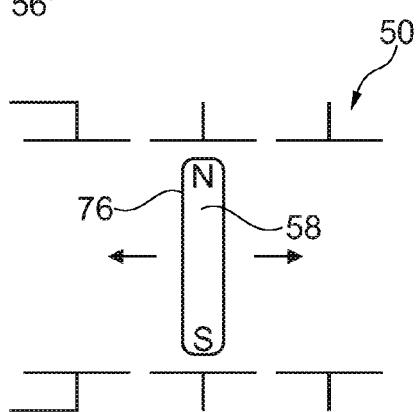
FIG. 14 schematically illustrates a switching procedure of a holding device according to an exemplary embodiment of the invention.

FIG. 13 shows a schematic view of a holding device 50 according to a further exemplary embodiment of the invention. FIG. 14 schematically illustrates a switching procedure of a holding device 50 according to an exemplary embodiment of the invention.

The relative motion between the permanent magnetic block 76 as (at least a part of the) magnetic field switching unit 58 and the magnetic paths can be realized by a motion of the permanent magnetic block 76 or the guiding structure of the path or a combination of both. The relative motion may be performed in the form of a translation, a rotation or a combination of both. FIG. 13 illustrates the example of a rotation for adjusting the different shown discrete switching states. In contrast, FIG. 14 illustrates the example of a translation for adjusting different shown switching states.

FIG. 15 illustrates for the embodiment according to FIG. 2 to FIG. 5 circumstances according to the schematic illustration corresponding to FIG. 12.

In the implementation of the above described principle, the mechanism according to exemplary embodiments of the invention consists of two magnetic paths, wherein a first path is characterized in FIG. 5 with reference sign 104 and a second path is characterized in FIG. 3 and FIG. 4 with reference sign 102. The first part 104 constitutes a secondary circuit according to circuit 1 of the above description. The second path 102 leads to an attraction of a ferromagnetic sample holder 52 by the polarization of two pole projections 72 and is thus the implementation of the described circuit 2.

FIG. 15 shows that the recess 62 comprises a first subsection originating from a blind hole bottom of the recess 62 up to the both slits or air holes 71 of the magnetic barrier 70 and a second subsection originating from the both slits or holes 71 of the magnetic barrier 70 up to an open end of the recess 62. The circumferential wall of the magnetic shoe 66 which delimits the recess 62 is denoted as first interface surface 106 in the first subsection. A respective counter surface or contact surface 110 of the permanent magnetic block 76 of the magnetic field switching unit 58 which, depending on the operation mode (i.e. holding mode or release mode) is contacting the first interface surface 106 or the second interface surface 108, advantageously has a smaller surface, in particular a surface which is at most half the size of the first interface surface 106 and has a smaller surface, in particular a surface which is at most half the size of the second interface surface 108.

Regardless at which subsurface region of the first interface surface 106 the contact surface 110 is contacting, the holding device 50 is always in the release mode. In a corresponding manner, the holding device 50 is in the holding mode, regardless at which subsurface region of the second interface surface 108 the contact surface 110 is contacting. In other words, the course of the magnetic field lines 98 in the release mode is substantially independent from the fact at which subsurface region the first interface surface 106 is contacting the contacting surface 110. In a corresponding manner, the course of the magnetic field lines 98 in the holding mode is substantially independent from the fact at which subsurface region the second interface surface 108 is contacting the contact surface 110. In this manner, a tight and precise positioning of the permanent magnetic block 76 for adjusting a switching state can be omitted in an advantageous manner. Thus, a defined switching state can be ensured even when a certain spatial deviation of the permanent magnetic block 76 from a target position is present. When the permanent magnetic block 76 is located in the region of the first interface surface 106, the magnetic field lines 98 are running mainly or even entirely on the left side of the slits of the magnetic barrier 70 (compare FIG. 5). On the contrary, when the permanent magnetic block 76 is located in the region of the second interface surface 108, the magnetic field lines 98 are running mainly or even entirely on the right side of the slits or the magnetic barrier 70 (compare FIG. 4).

Complementary it should be noted that "comprising" does not exclude the presence of other elements or steps and "a" or "one" do not exclude a multiplicity. Furthermore, it should be noted that features or steps which are described with reference to one of the above described embodiments can also be used in combination with other features or steps of other embodiments described above. Reference signs in the claims are not to be considered as limitation.

The invention claimed is:

1. A holding device for detachably holding a magnetic sample holder or sample body, in particular for a scanning probe microscope, wherein the holding device comprises:
an accommodation unit for accommodating a magnetic sample holder or a sample body;
a magnetic field guiding unit which, in a holding mode, is adapted for guiding a magnetic field for applying a magnetic holding force at the accommodation unit for holding the magnetic sample holder or the sample body which is accommodated at the accommodation unit;
a magnetic field switching unit which is adapted for switching between at least two relative spatial arrangements between the magnetic field guiding unit and the magnetic field switching unit, in order to selectively adjust the holding mode or a release mode, wherein in the release mode the magnetic sample holder or sample body is released for being detached from the accommodation unit, and
wherein the magnetic field switching unit is configured to switch between the at least two relative spatial arrangements by moving the magnetic field switching unit, such that, in at least one of the two relative spatial arrangements, the magnetic field switching unit is at least partially inserted longitudinally into a recess in the magnetic field guiding unit.

2. The holding device according to claim 1, wherein the magnetic field switching unit comprises a magnet for generating the magnetic field.

3. The holding device according to claim 1, wherein the magnetic field guiding unit comprises or consists of magnetizable material.

4. The holding device according to claim 1, wherein in the release mode the magnetic field is guided away from the accommodation unit.

5. The holding device according to claim 1, wherein the magnetic field switching unit is adapted for switching between the at least two relative spatial arrangements by linearly moving at least a part of the magnetic field switching unit.

6. The holding device according to claim 1, wherein the magnetic field switching unit is adapted for purely mechanically switching between the at least two relative spatial arrangements.

7. The holding device according to claim 1, wherein the magnetic field guiding unit and the magnetic field switching unit are adapted for, in the release mode, switching off the magnetic holding force which is acting in the holding mode for holding the magnetic sample holder or sample body which is accommodated at the accommodation unit.

8. The holding device according to claim 1, wherein the magnetic field guiding unit and the magnetic field switching unit are adapted, in the holding mode, for forming magnetic field lines passing through the sample holder or the sample body at the accommodation unit, and in the release mode, for forming magnetic field lines passing through an alternative path.

9. The holding device according to claim 1, comprising at least one of the following features:
wherein the magnetic field guiding unit and the magnetic field switching unit are adapted
in the holding mode, for forming a magnetic circuit through the sample holder or sample body at the accommodation unit, and in the release mode, for forming an alternative magnetic circuit past the sample holder or sample body at the accommodation unit;

wherein the magnetic field switching unit is adapted as a source of a magnetic flux, whose magnetic flux, by switching between the at least two relative spatial arrangements, is guidable through two different magnetic paths which are defined by the magnetic field guiding unit;

wherein the magnetic field guiding unit and the magnetic field switching unit are adapted such that during converting between the at least two relative spatial arrangements, a sum of the magnetic resistances of the both magnetic paths is substantially constant;

wherein at least one of the at least two relative spatial arrangements is assigned to an associated stop position of the magnetic field switching unit at a boundary wall in a recess in an interior of the magnetic field guiding unit;

wherein the holding device further comprises:
a bias unit configured for mechanically biasing the magnetic field switching unit in one of the at least two relative spatial arrangements.

10. The holding device according to claim 1, wherein the magnetic field guiding unit comprises a magnetic shoe with a recess, and the magnetic field switching unit comprises a magnetic carriage which is mounted for displacing in the recess.

11. The holding device according to claim 10, comprising at least one of the following features:
wherein the magnetic shoe comprises, substantially perpendicular with respect to a displacement direction of the magnetic carriage, a magnetic barrier which is defined by a nonmagnetic material in one or more air gaps;
wherein a permanent magnetic block of the magnetic carriage has a contact surface with a first interface surface of an adjacent wall of the recess on a side of the magnetic barrier in the release mode, and/or
with a second interface surface of an adjacent wall of the recess on another side of the magnetic barrier in the holding mode,
which contact surface is smaller than the first interface surface and/or is smaller than the second interface surface.

12. The holding device according to claim 10, wherein the magnetic shoe at a surface which is facing the accommodation unit comprises two pole projections made of magnetic material.

13. The holding device according to claim 10, wherein the magnetic carriage comprises a permanent magnetic block which is molded to a nonmagnetic material of the magnetic carriage.

14. The holding device according to claim 1, configured as energetically autarkic holding device operable without an electric energy supply.

15. The holding device according to claim 1, comprising at least one further magnetic field guiding unit and at least one further magnetic field switching unit with the features according to claim 1, wherein the magnetic field guiding unit and the magnetic field switching unit and the at least one further magnetic field guiding unit and the at least one further magnetic field switching unit are adapted for commonly acting on the same accommodation unit.

16. The holding device according to claim 15, comprising a control body which is drivable for simultaneously acting upon the magnetic field switching unit and the at least one further magnetic field switching unit.

17. The holding device according to claim 16, wherein the control body is configured as a control disk which is drivable in a rotating manner to simultaneously act upon the magnetic field switching unit and the at least one further magnetic field switching unit which, and wherein the control body together with the magnetic field guiding unit and the at least one further magnetic field guiding unit, are arranged circumferentially around the control disk and/or within the control disk.

18. A scanning probe microscope for determining surface information with respect to a sample body by scanningly sampling a surface of a sample body, wherein the scanning probe microscope comprises:
a magnetic sample holder for holding the sample body, or a magnetic sample body;
a holding device for detachably holding the magnetic sample holder or the sample body, the holding device having:
an accommodation unit for accommodating a magnetic sample holder or a sample body;
a magnetic field guiding unit which, in a holding mode, is adapted for guiding a magnetic field for applying a magnetic holding force at the accommodation unit for holding the magnetic sample holder or the sample body accommodated at the accommodation unit; and
a magnetic field switching unit adapted for switching between at least two relative spatial arrangements between the magnetic field guiding unit and the magnetic field switching unit to selectively adjust the holding mode or a release mode, wherein in the release mode the magnetic sample holder or the sample body is released for being detached from the accommodation unit, wherein the magnetic field switching unit is configured to switch between the at least two relative spatial arrangements by moving at least a part of the magnetic field switching unit, such that, in at least one of the two relative spatial arrangements, the magnetic field switching unit is at least partially inserted longitudinally into a recess in the magnetic field guiding unit.

19. The scanning probe microscope according to claim 18, comprising at least one of the following features:
wherein the scanning probe microscope is configured as an atomic force microscope;
wherein the scanning probe microscope comprises a measuring probe which is adapted for scanningly sensing the surface of the sample body.

20. A method for detachably holding a magnetic sample holder or sample body, in particular of a scanning probe microscope, wherein the method comprises:
accommodating a magnetic sample holder or a sample body at an accommodation unit;
in a holding mode, guiding a magnetic field for applying a magnetic holding force at the accommodation unit for holding the magnetic sample holder or sample body which is accommodated at the accommodation unit by means of a magnetic field guiding unit; and
switching from one to another of at least two relative arrangements between the magnetic field guiding unit and a magnetic field switching unit in order to, starting from the holding mode, adjust a release mode in which the magnetic sample holder or sample body is released for being detached from the accommodation unit,
thereby switching between the at least two relative spatial arrangements by moving at least a part of the magnetic field switching unit, such that, in at least one of the two relative spatial arrangements, the magnetic field switching unit is at least partially inserted into the magnetic field guiding unit.

* * * * *

UNITED STATES PATENT AND TRADEMARK OFFICE
CERTIFICATE OF CORRECTION

| | | |
|---|---|---|
| PATENT NO. | : 10,330,698 B2 | Page 1 of 1 |
| APPLICATION NO. | : 15/785791 | |
| DATED | : June 25, 2019 | |
| INVENTOR(S) | : Norbert Pinno-Rath and Daniel Koller | |

It is certified that error appears in the above-identified patent and that said Letters Patent is hereby corrected as shown below:

On the Title Page

Item (30) titled, Foreign Application Priority Data:
-(AU)-
Should read:
--(AT)--.

Signed and Sealed this
Third Day of September, 2019

Andrei Iancu
*Director of the United States Patent and Trademark Office*